United States Patent
Griffin

[11] Patent Number: 6,097,553
[45] Date of Patent: Aug. 1, 2000

[54] WINDOW STRUCTURE WITH NON-RADIAL MOUNTING SUPPORT HAVING GRADED THERMAL EXPANSION

[75] Inventor: William S. Griffin, Manhattan Beach, Calif.

[73] Assignee: Raytheon Company, Lexington, Mass.

[21] Appl. No.: 09/243,370

[22] Filed: Feb. 1, 1999

[51] Int. Cl.[7] .................................................. G02B 7/02
[52] U.S. Cl. .............................................................. 359/820
[58] Field of Search ........................... 359/820; 219/521, 219/522

[56] References Cited

U.S. PATENT DOCUMENTS

| | | | |
|---|---|---|---|
| 4,699,335 | 10/1987 | DeOms et al. | 244/129.3 |
| 5,391,958 | 2/1995 | Kelly | 313/420 |
| 5,557,474 | 9/1996 | McCrary | 359/820 |
| 5,809,707 | 9/1998 | Bargados et al. | 52/204.62 |

*Primary Examiner*—Ricky Mack
*Attorney, Agent, or Firm*—Colin M. Raufer; Leonard A. Alkov; Glenn H. Lenzen, Jr.

[57] ABSTRACT

A window structure includes a housing, a window received into the housing, and a mounting support joining the window to the housing. The mounting support has an outer support ring joined to the housing, where the outer support ring has a coefficient of thermal expansion of about that of the housing, and an inner support ring joined to the window, where the inner support ring has a coefficient of thermal expansion of about that of the window. The inner support ring is joined to the outer support ring by a single-segment or multi-segment ring with a gradation in thermal expansion coefficient, but is not radially aligned with the outer support ring. The result is a large reduction in the stresses and strains otherwise imposed on the window.

20 Claims, 3 Drawing Sheets

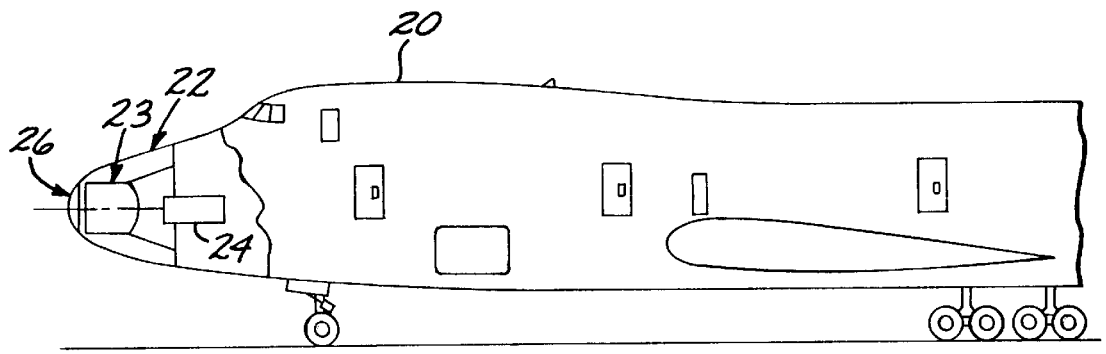
FIG. IA
FIG. IB
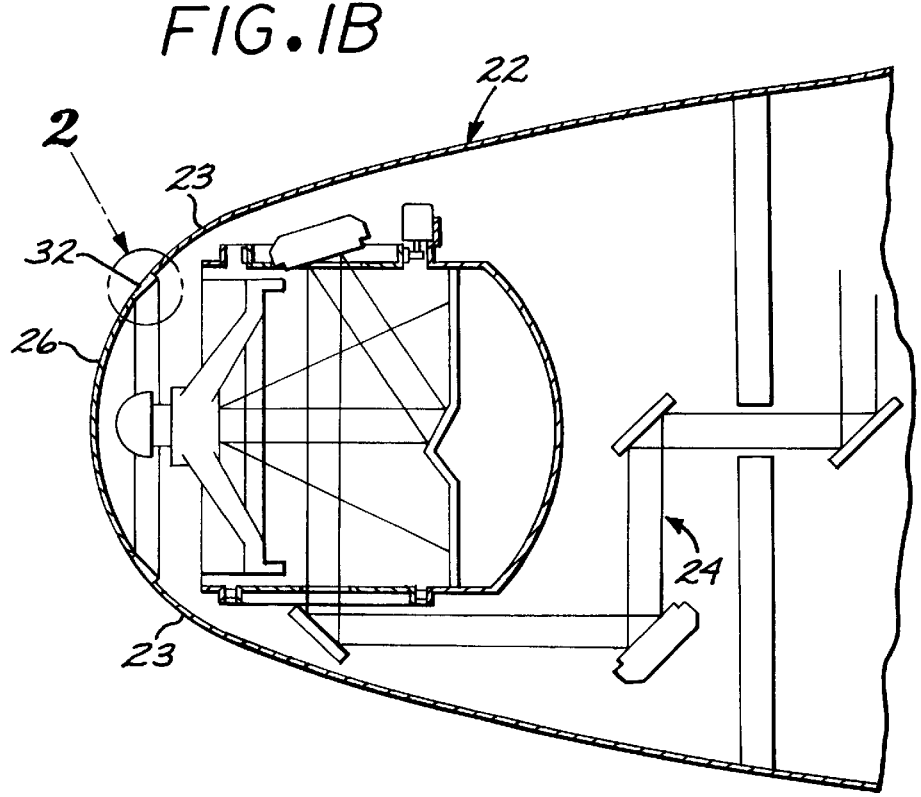

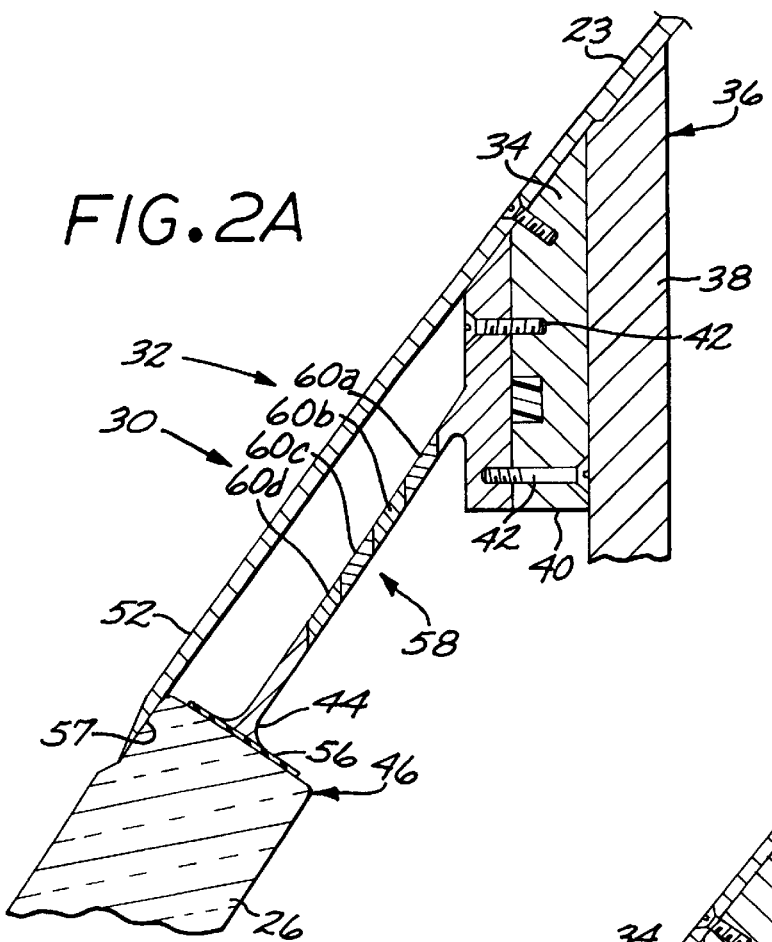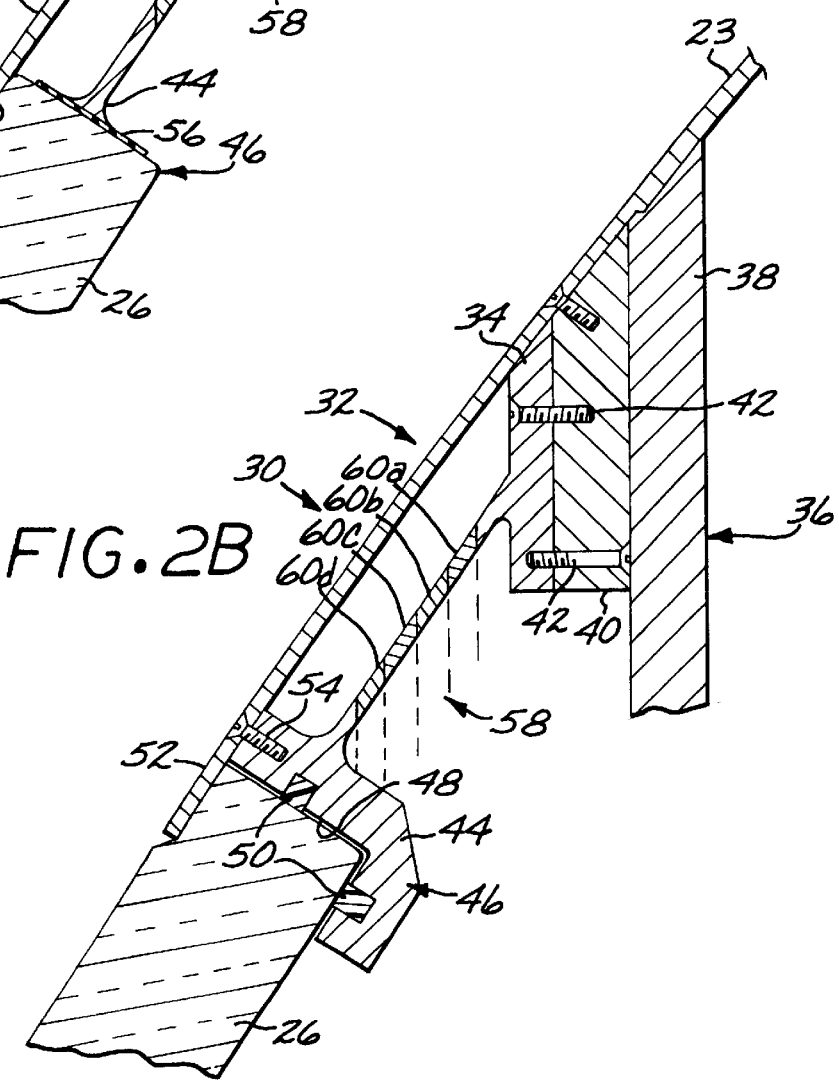

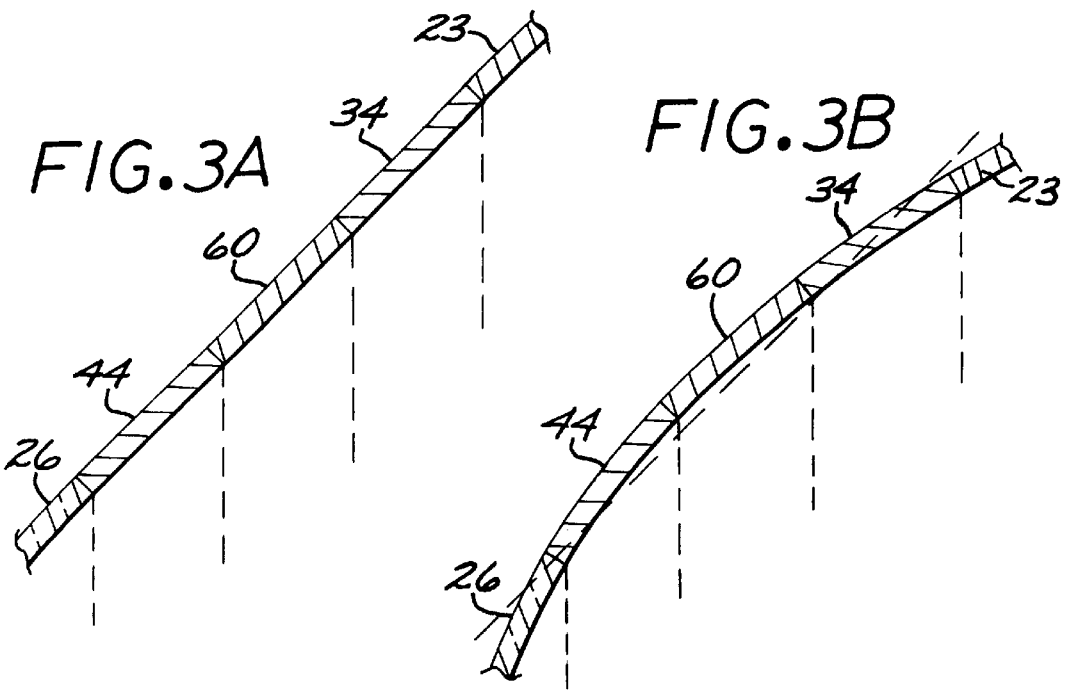
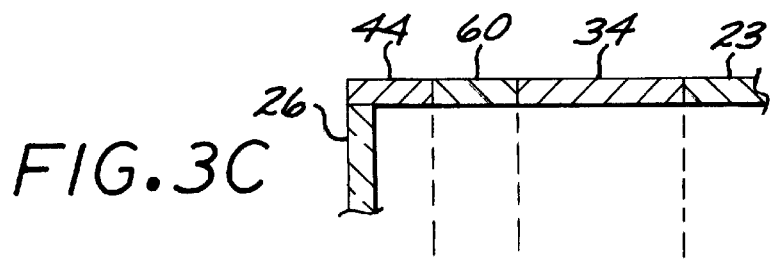
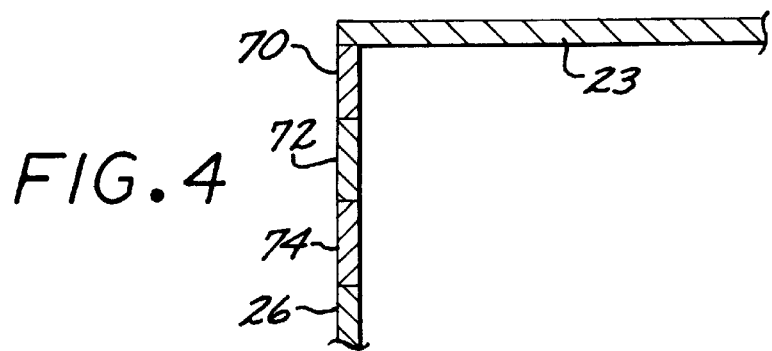

WINDOW STRUCTURE WITH NON-RADIAL MOUNTING SUPPORT HAVING GRADED THERMAL EXPANSION

BACKGROUND OF THE INVENTION

This invention relates to the mounting of windows, and particularly to the mounting of windows that are subjected to large temperature changes during service.

Sensors and tracking devices operating in the visible and infrared wavelength bands are used in civilian and military applications. The optics and sensing elements of such sensors and trackers are of very high quality and easily damaged. They are therefore usually placed behind a protective window that is transparent to the radiation being sensed but protects the optics from damage due to hostile physical and chemical environmental effects, impacts, and the like.

The sensor is normally mounted inside a metallic or composite-material housing, such as a portion of the fuselage of an aircraft or a turret affixed to the aircraft. The window is a material that is transparent to the wavelength being utilized by the sensor or tracker. For visible light, the window may be a glass such as fused silica. The material of the window normally has a coefficient of thermal expansion quite different from that of the housing. In an example, a fused silica window has a coefficient of thermal expansion of $0.4 \times 10^{-6}$ per ° C, and an aluminum alloy housing has a coefficient of thermal expansion of $21 \times 10^{-6}$ per ° C. (The "coefficient of thermal expansion", as used herein, is the linear coefficient of thermal expansion.) In this typical example, the coefficient of thermal expansion of the window is much less than that of the housing, as is the case for many situations of practical interest.

The window is mounted to the housing by a mounting support. The nature of the mounting support depends upon the dimensions of the window. For small windows, on the order of a few inches in diameter, the strains and stresses caused by a difference in coefficients of thermal expansion between the window and the housing is of relatively little consequence. However, as the window is made larger, the strains and stresses caused by a difference in the coefficients of thermal expansion becomes an important consideration. The total distortion of a structure due to the differences in thermal expansion of the elements is proportional to the absolute dimensions of the structure, the difference in the coefficients of expansion, and the temperature range experienced as the structure is heated and cooled. High-power laser tracker systems now under development use windows that are 40–60 inches in diameter and operate over temperature ranges of 100° C. or more, so that the total distortion of the mounting structure at the periphery of the window may be expected to be on the order of 0.1 inches.

When the structure is distorted by such large amounts, stresses are generated. For some applications, the stresses are readily sustained and are not troublesome. For a window application, on the other hand, the stresses, if transmitted into the window, cause the window itself to deform and possibly fail by shattering. The result of deformation of the window is severe distortion of the optical beam that passes through the window, greatly reducing the effectiveness of the sensor or tracking system.

There exist techniques for mounting the window into the housing that reduce the effects of the differences in coefficients of thermal expansion of the elements. In one, a sliding contact is effected between the window and the mounting support, which is sealed by O-rings or spring loaded seals. This approach has the drawbacks that the sliding contact has high friction forces, provides no moment relief, and has moderate leakage. In another approach, a flexible polymeric (typically rubber) sealing and mounting ring is bonded to both the window and the support structure. This approach has the drawbacks of leakage through the polymer that tends to contaminate the internal volume of the housing, outgassing into the internal volume of the housing, and variable mounting characteristics due to the change with temperature of the elasticity of the polymeric ring. Thus, the presently available approaches, while operable to some extent, are not fully satisfactory.

There is a need for an improved window structure operable with large windows and over a wide temperature range. The present invention fulfills this need, and further provides related advantages.

SUMMARY OF THE INVENTION

The present invention provides a mounting support that joins a window to a housing, and a window structure using that mounting support. The mounting support holds the window securely in place yet produces minimal distortion of the window due to thermal expansion mismatch and/or bending moments. The mounting support resists a loss of structural integrity due to pressure differences between the interior and the exterior of the housing. The mounting support seals the interior of the housing with little or no leakage.

In accordance with the invention, a window structure comprises a housing having a housing coefficient of thermal expansion and a window received into the housing. The window has a window coefficient of thermal expansion different from the housing coefficient of thermal expansion. The window structure further includes a mounting support comprising a series of joined annular support rings of different coefficients of thermal expansion, wherein the mounting support is joined at an inner periphery to the window and at an outer periphery to the housing. The support rings have a graded progression of their coefficients of thermal expansion between that of the housing and that of the window. The support rings are not radially aligned.

In one preferred embodiment, the mounting support comprises an outer support ring joined to the housing, where the outer support ring has an outer support ring coefficient of thermal expansion of about the housing coefficient of thermal expansion. There is an inner support ring joined to the window, where the inner support ring has an inner support ring coefficient of thermal expansion of about the window coefficient of thermal expansion. The mounting support further includes an intermediate support ring structure positioned intermediate between, and joined to, the outer support ring and the inner support ring. The intermediate support ring structure comprises at least one intermediate support ring, and preferably several intermediate support rings.

The outer support ring and the inner support ring are preferably each substantially annular and planar. The outer support ring and the inner support ring do not lie in the same plane and instead lie in parallel planes. Preferably, the outer support ring and the inner support ring define a conical surface or a cylindrical surface; they do not define a flat, planar surface. This arrangement allows the support rings to flex to accommodate thermal expansion mismatches resulting from temperature changes of the window and housing, without suffering substantial stresses which would damage either the support rings or the window. The matched coefficient of thermal expansion of the inner support ring, which is preferably close to that of the window and most preferably no more than about $5\times10^{-6}$ per °C. different from that of the window, minimizes peripheral strains at the edge of the window that would otherwise result in strains in the window and optical distortion of the beams passing through the window.

There may be at least one, and preferably several, intermediate support rings between the outer support ring and the inner support ring. The intermediate support rings are disposed between and joined to the outer support ring and the inner support ring. The intermediate support rings have coefficients of thermal expansions monotonically graded between that of the outer support ring and that of the inner support ring. This grading of the coefficients of thermal expansion aids in achieving a gradual transition in the coefficient of thermal expansion between the window and the housing. Coupled with the non-coplanar character of the support rings, which allows the mounting support to flex, the gradual transition achieves its objectives of holding the window in place with minimal distortion and movement over a large operating temperature range, while effectively sealing the interior of the housing.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1A is an elevational view of an aircraft having a turret and a window structure in the housing;

FIG. 1B is an interior detail of the turret and window structure;

FIG. 2A is a sectional view through the window structure of FIG. 1B, taken along lines 2—2, showing a first preferred embodiment of a window structure;

FIG. 2B is a sectional view through the window structure of FIG. 1B, taken along lines 2—2, showing a second preferred embodiment of a window structure;

FIG. 3A schematically illustrates a conical arrangement of the support rings that is within the scope of the invention;

FIG. 3B schematically illustrates a bowed conical arrangement of the support rings that is within the scope of the invention;

FIG. 3C schematically illustrates a cylindrical arrangement of the support rings that is within the scope of the invention; and FIG. 4 schematically illustrates a radially planar arrangement of the support rings that is not within the scope of the invention.

DETAILED DESCRIPTION OF THE INVENTION

FIGS. 1A depicts an aircraft 20 having a turret 22 and a movable ball housing 23 mounted to the front of the fuselage of the aircraft 20, and FIG. 1B illustrates the system in greater detail. The aircraft 20 encloses a laser system 24. A window 26 on the front of the ball housing 23 permits a laser beam to pass through the housing to the exterior. Various potential applications utilize fused silica glass windows 26 that are generally round, from about 40 to about 60 inches in diameter, and about 1¼ inches thick. The present invention deals with the manner in which the window 26 is supported on and sealed to the ball housing 23.

FIG. 2A illustrates a first preferred embodiment of a window structure 30, including the ball housing 23, the window 26, and a mounting support 32 joining the window 26 to the ball housing 23. (FIGS. 2A, 2B, 3A, 3B, 3C, and 4 are sections through a region adjacent to the window 26 that has a generally cylindrical symmetry.) The ball housing 23 is characterized by a housing coefficient of thermal expansion. The ball housing 23 is typically made of aluminum alloy such as 6061-T6, having a coefficient of thermal expansion of about $21\times10^{-6}$ per °C. The window 26 is typically fused silica having a coefficient of thermal expansion of about $0.4\times10^{-6}$ per °C.

The mounting support 32 includes an annular outer support ring 34 joined to the ball housing 23 by a housing/outer support ring joint 36. In this case, the joint 36 includes an adapter plate 38 welded to the ball housing 23, and a base plate 40 welded to the adapter plate 38. The outer support ring 34 is fastened to the base plate 40 by mechanical threaded fasteners 42. The outer support ring 34 is shaped to permit this fastening.

The mounting support 32 also includes an annular inner support ring 44 joined to the window 26 by an inner support ring/window joint 46. In the embodiment of FIG. 2A, the joint 46 includes an internal shoulder 48 into which the window 26 is received and sealed by two O-rings 50. The window 26 is held against the shoulder 48 and O-rings 50 by a retainer ring 52 that is fastened to the inner support ring 44 by a threaded fastener 54. In the embodiment of FIG. 2B, the joint 46 is a glass-to-metal seal 56. Such seals are known in the art. The glass-to-metal seal 56 is preferably made by thermal fusion or an adhesive. The inner support ring 44 is shaped as required for the type of joint 46 selected. In the embodiment of FIG. 2B, the retainer ring 52 is biased toward the outer periphery of the window 26 by a preformed curvature in the retainer ring 52. The embodiments of FIGS. 2A and 2B are otherwise the same.

The retainer ring 52 protects against blowout of the window 26 in the event that, for any reason, the internal pressure within the ball housing 23 should become larger than the external pressure.

The outer support ring 34 is made of a material having an outer support ring coefficient of thermal expansion which is about the same as the ball housing coefficient of thermal expansion. The inner support ring 44 is made of a material having an inner support ring coefficient of thermal expansion which is about the same as the window coefficient of thermal expansion. In one embodiment using the aluminum alloy ball housing 23, the outer support ring 34 is made of Carpenter 22-3 alloy, which has a coefficient of thermal expansion of about $19\times10^{-6}$ per °C. In this same embodiment with a fused silica window, the inner support ring 44 is made of Invar, which has a coefficient of thermal expansion of about $1\times10^{-6}$ per °C. The outer support ring 34 has a coefficient of thermal expansion of "about" that of the housing 23, and preferably within $5\times10^{-6}$ per °C of that of the housing 23. The coefficient of thermal expansion of the outer support ring 34 is preferably less than that of the housing 23. The inner support ring 44 has a coefficient of thermal expansion of "about" that of the window 26, and preferably within $5\times10^{-6}$ per °C. of that of the window 26. The coefficient of thermal expansion of the inner support ring 44 is preferably greater than that of the window. These limits are chosen in order to achieve an acceptable match in the respective coefficients of thermal expansion. Otherwise, unacceptably large thermal strains and stresses may result. The specific compositions of the materials used in the support rings 34 and 44 is not of significance—the important consideration is selecting materials with the desired coefficients of thermal expansion. Other alloys with similar coefficients of thermal expansion may be used as well.

The outer support ring 34 is joined to the inner support ring 44, either directly or indirectly through intermediate structure. In some instances, particularly where the coefficients of expansion of the housing and the window are not too dissimilar, it is possible to join the outer support ring 34 directly to the inner support ring 44, by an operable joining operation to create a joint such as a fusion welded joint, a friction welded joint, a diffusion-bonded joint, or a brazed joint.

In the preferred embodiment used here as an example and which is typically the case found in practice, the coefficient of expansion of the aluminum ball housing 23 is too different from that of the window 26 to form the mounting support using only the outer support ring 34 and the inner support ring 44. An intermediate structure 58 is therefore used. The intermediate structure 58 preferably includes one or more (in the illustrated case, four) annular intermediate support rings 60 joined together to form a structure of graded thermal expansion coefficient. The four intermediate support rings 60 include a first intermediate support ring 60a joined at its outer periphery to the outer support ring 34, a second intermediate support ring 60b joined at its outer periphery to the first intermediate support ring 60a, a third intermediate support ring 60c joined at its outer periphery to the second intermediate support ring 60b, and a fourth intermediate support ring 60d joined at its outer periphery to the third intermediate support ring 60c and at its inner periphery to the outer periphery of the inner support ring 44. The joints between the support rings may be made by any operable joining operation, such as fusion welding, friction welding, diffusion bonding, or brazing. Different joining techniques may be used for the different support ring joints in a single structure.

The materials of construction of the intermediate support rings 60 are preferably selected so that there is a graded and monotonic change in the coefficient of thermal expansion from the values near to that of the ball housing 23 at first intermediate support ring 60a to near to that of the window at the fourth intermediate support ring 60d. That is, in the illustrated case of an aluminum housing and a fused silica window, the first intermediate support ring 60a has a coefficient of thermal expansion less than that of the outer support ring 34, the second intermediate support ring 60b has a coefficient of thermal expansion less than that of the first intermediate support ring 60a, the third intermediate support ring 60c has a coefficient of thermal expansion less than that of the second intermediate support ring 60b, and the fourth intermediate support ring 60d has a coefficient of thermal expansion less than that of the third intermediate support ring 60d, but greater than that of the inner support ring 44. In other applications, the coefficient of expansion of the housing might be less than that of the window, so the grading would be from a smaller coefficient of thermal expansion at the ball housing to a larger coefficient of thermal expansion at the window.

Due to the limitations of availability of materials that may be formed into large-diameter rings, it is typically not possible that the intervals between the coefficients of linear expansion of the various support rings be the same, nor is that required. In the preferred embodiment illustrated in FIGS. 2A and 2B, the first intermediate support ring 60a is PH15-7Mo steel having a coefficient of expansion of $16 \times 10^{-6}$ per ° C., the second intermediate support ring 60b is 410 stainless steel having a coefficient of expansion of $11.2 \times 10^{-6}$ per ° C., the third intermediate support ring 60c is Carpenter Glass Sealing Alloy 42 having a coefficient of expansion of $6.55 \times 10^{-6}$ per ° C., and the fourth intermediate support ring 60d is Carpenter Low Expansion Alloy 42 having a coefficient of expansion of $4.5 \times 10^{-6}$ per ° C. The nominal compositions of these alloys in weight percent are as follows. PH15-7Mo steel: 0.05 percent maximum carbon, 0.1 percent maximum magnesium, 0.01 percent maximum phosphorus, 0.008 percent maximum sulfur, 0.10 percent maximum silicon, 18±0.5 percent chromium, 7±0.5 percent nickel, 1.1±0.2 percent aluminum, 2.1±0.3 percent molybdenum, 0.01 percent maximum nitrogen, balance iron; 410 stainless steel: 0.15 percent maximum carbon, 1 percent maximum manganese, 0.04 percent maximum phosphorus, 0.03 percent maximum sulfur, 1 percent maximum silicon, 11.5–13.5 percent chromium, balance iron; Carpenter Glass Sealing Alloy 42-G: 0.5 percent maximum carbon, 0.50 percent manganese, 0.25 percent silicon, 42.5 percent nickel, 5.75 percent chromium, balance iron; and Carpenter Low Expansion Alloy 42:0.05 percent maximum carbon, 0.4 percent manganese, 0.2 percent silicon, 41 percent nickel, balance iron.

Thus, the support rings 34, 44, and 60 (where used) provide a graded transition in coefficient of thermal expansion from that of the housing to that of the window. The specific compositions of the materials used in the support rings 60 is not of significance—the important consideration is selecting materials with the indicated gradation of the coefficients of thermal expansion.

The support rings 34, 44, and 60 (where used) are arranged so that the difference in expansion between the structure and the support rings is accommodated by a bending and stretching deformation of the relatively thin support rings. (In the preferred embodiment, each of the support rings 34, 44, and 60 are made of material about 0.078 inches thick and 60–63 inches in diameter, permitting the support ring to flex substantially.) To permit such bending, the outer support ring 34 and the inner support ring 44 lie in different, but parallel planes, termed a "non-radial" configuration. FIGS. 3A–3C illustrate three operable configurations that meet this criterion. In each of FIGS. 3A–3C, there is an outer support ring 34 joined to the ball housing 23, an inner support ring 44 joined to the window 26, and a single intermediate support ring 60 (for illustration purposes, rather than the four intermediate support rings as in FIGS. 2A and 2B) joined to the outer support ring 34 and to the inner support ring 44.

In FIG. 3A, the outer support ring 34, the inner support ring 44, and the intermediate support ring 60 are linear and define the surface of a cone. In FIG. 3B, the conical surface may be defined by a line running through the centers of the outer support ring 34 and the inner support ring 44, but the intermediate support ring 60 is slightly outwardly bowed. The outward bowing may follow any operable shape. In FIG. 3C, the outer support ring 34, the inner support ring 44, and the intermediate support ring 60 define a cylindrical shape, which may be either straight-side as illustrated or bowed. In all of these cases, the plane of the outer support ring 34 and the plane of the inner support ring 44 are parallel but different (i.e., not coincident) planes, and all of these configurations are within the scope of the invention.

FIG. 4 illustrates an arrangement of three support rings 70, 72, and 74 that is not within the scope of the invention. Here, the support rings 70 and 72, as well as the support ring 72 lie in a single coincident plane. If this structure were used, the dimensional changes resulting from differences in the coefficients of thermal expansion would not be dissipated by bending, but instead would create high stresses within the support rings 70, 72, and 74. These high stresses would result in strains within the window 26, which is unacceptable because it leads to deforming of the window and thence interference with the optics of the laser system 24 or other optical device protected by the window 26. In the arrangements of the type illustrated in FIGS. 3A–C, any thermal expansion strains are accommodated by bending of the support rings 34, 44, and 60, so that there is little deformation of the window 26 and little interference with the optics of the system.

The present design of FIGS. 2A and 2B has been analyzed using a finite-element method for use in a system generally like that shown in FIGS. 1A and 1B wherein the window has a diameter of about 60 inches. The operational cycle was between a temperature of 60° C. at sea level and flight conditions of Mach 0.85 at 45,000 feet, where the temperature is −55° C. and the pressure loading across the window is about 2.5 psi (pounds per square inch). During the simulated operational cycle, the performance of the optics remained diffraction limited (i.e., optically perfect within requirements) and not limited by thermal stresses or strains. The calculated maximum thermal stress is an acceptable −347 psi (compressive). This performance was retained through a simulated 4G aircraft maneuver.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A window structure, comprising:
   a housing having a housing coefficient of thermal expansion;
   a window received into the housing, the window having a window coefficient of thermal expansion different from the housing coefficient of thermal expansion; and
   a mounting support comprising a series of joined annular support rings of different coefficients of thermal expansion,
   wherein the mounting support is joined at an inner periphery to the window and at an outer periphery to the housing,
   wherein the support rings have a graded progression of their coefficients of thermal expansion between that of the housing and that of the window, and wherein the support rings are not radially aligned.

2. The window structure of claim 1, wherein the support rings are each substantially planar and lie in parallel planes.

3. The window structure of claim 1, wherein the housing coefficient of thermal expansion is greater than the window coefficient of thermal expansion.

4. The window structure of claim 1, wherein the support rings together define a conical surface.

5. The window structure of claim 1, wherein the support rings together define a cylindrical surface.

6. The window structure of claim 1, wherein the series of support rings includes at least three support rings.

7. The window structure of claim 1, further including
   a retainer ring affixed to an exterior surface of the mounting support and overlying an outer periphery of the window.

8. The window structure of claim 1, wherein the mounting support comprises
   an outer support ring joined to the housing, and
   an inner support ring joined to the window.

9. The window structure of claim 8, wherein the mounting support further comprises
   an intermediate support ring structure joined on an outer periphery to the outer support ring and on an inner periphery to the inner support ring, the intermediate support ring structure including at least one intermediate support ring having an intermediate support ring coefficient of thermal expansion between that of the inner support ring and the outer support ring, wherein the intermediate support ring is not radially aligned with the inner support ring and is not radially aligned with the outer support ring.

10. The window structure of claim 9, wherein the intermediate support ring structure comprises
    at least two intermediate support rings having progressive decreasing coefficients of thermal expansion from that of the outer support ring to that of the inner support ring.

11. A window structure, comprising:
    a housing having a housing coefficient of thermal expansion;
    a window having a window coefficient of thermal expansion that is different from the housing coefficient of thermal expansion; and
    a mounting support joining the window to the housing, the mounting support comprising
       an outer support ring having an outer support ring coefficient of thermal expansion of about the housing coefficient of thermal expansion,
       a housing/outer support ring joint between the housing and the outer support ring,
       an inner support ring having an inner support ring coefficient of thermal expansion of about the window coefficient of thermal expansion, wherein the inner support ring is not radially aligned with the outer support ring,
       an outer support ring/inner support ring joint structure between the outer support ring and the inner support ring, and
       an inner support ring/window joint between the inner support ring and the window.

12. The window structure of claim 11, wherein the outer support ring and the inner support ring are each substantially planar, and wherein the outer support ring and the inner support ring lie in parallel planes.

13. The window structure of claim 11, wherein the outer support ring and the inner support ring are each annular in shape.

14. The window structure of claim 11, wherein the outer support ring/inner support ring joint structure includes
    an intermediate support ring structure joined on an outer periphery to the outer support ring and on an inner periphery to the inner support ring, the intermediate support ring structure including at least one intermediate support ring having an intermediate support ring coefficient of thermal expansion between that of the inner support ring and the outer support ring, wherein the intermediate support ring is not radially aligned with the inner support ring and is not radially aligned with the outer support ring.

15. The window structure of claim 11, wherein the housing/outer support ring joint comprises a mechanical joint having a housing/outer support ring joint O-support ring seal.

16. The window structure of claim 11, wherein the outer support ring/inner support ring joint comprises a joint selected from the group consisting of a welded joint, a diffusion bonded joint, and a brazed joint.

17. The window structure of claim 11, wherein the inner support ring/window joint comprises a mechanical joint having an inner support ring/window joint O-support ring seal.

18. The window structure of claim 11, further including
a retainer ring affixed to an exterior surface of the outer support ring and overlying an outer periphery of the window.

19. A window structure, comprising:
a housing having a housing coefficient of thermal expansion;
a window received into the housing, the window having a window coefficient of thermal expansion different from the housing coefficient of thermal expansion; and
a mounting support joining the window to the housing, the mounting support comprising
an outer support ring joined to the housing, the outer support ring having an outer support ring coefficient of thermal expansion of about the housing coefficient of thermal expansion,
an inner support ring joined to the window, the inner support ring having an inner support ring coefficient of thermal expansion of about the window coefficient of thermal expansion,
an intermediate support ring structure positioned intermediate between, and joined to, the outer support ring and the inner support ring, the intermediate support ring structure comprising at least one intermediate support ring,
wherein the outer support ring, each intermediate support ring, and the inner support ring have a graded progression of their coefficients of thermal expansion, and
wherein the inner support ring, the outer support ring, and each intermediate support ring are not radially aligned.

20. The window structure of claim 19, further including
a retainer ring affixed to an exterior surface of the mounting support and overlying an outer periphery of the window.

* * * * *